United States Patent
Kaneko et al.

(10) Patent No.: US 10,272,900 B2
(45) Date of Patent: Apr. 30, 2019

(54) HYBRID WHEEL LOADER

(71) Applicant: KCM Corporation, Kaku-gun, Hyogo (JP)

(72) Inventors: Satoru Kaneko, Tokyo (JP); Takashi Ikimi, Tsuchiura (JP); Noritaka Itou, Tsuchiura (JP); Yuuichi Kunitomo, Tsuchiura (JP)

(73) Assignee: KCM Corporation, Hyogo (JP)

( * ) Notice: Subject to any disclaimer, the term of this patent is extended or adjusted under 35 U.S.C. 154(b) by 38 days.

(21) Appl. No.: 15/315,884

(22) PCT Filed: Feb. 25, 2015

(86) PCT No.: PCT/JP2015/055461
§ 371 (c)(1),
(2) Date: Dec. 2, 2016

(87) PCT Pub. No.: WO2015/186381
PCT Pub. Date: Dec. 10, 2015

(65) Prior Publication Data
US 2017/0088115 A1  Mar. 30, 2017

(30) Foreign Application Priority Data

Jun. 3, 2014  (JP) ................................. 2014-115182

(51) Int. Cl.
*B60K 6/26* (2007.10)
*B60K 6/28* (2007.10)
(Continued)

(52) U.S. Cl.
CPC ............... *B60W 20/10* (2013.01); *B60K 6/26* (2013.01); *B60K 6/28* (2013.01); *B60K 6/46* (2013.01);
(Continued)

(58) Field of Classification Search
CPC ...... B60W 20/10; B60W 10/06; B60W 10/08; B60W 10/26; E02F 9/2075; E02F 9/20;
(Continued)

(56) References Cited

U.S. PATENT DOCUMENTS

| 2002/0125052 A1 | 9/2002 | Naruse et al. | |
|---|---|---|---|
| 2006/0111212 A9 * | 5/2006 | Ai ........................ | B60K 6/365 475/5 |

(Continued)

FOREIGN PATENT DOCUMENTS

| DE | 42 17 668 C1 | 5/1993 |
|---|---|---|
| DE | 10 2007 002 734 A1 | 7/2008 |

(Continued)

OTHER PUBLICATIONS

International Search Report (PCT/ISA/210) issued in PCT Application No. PCT/JP2015/055461 dated Jun. 2, 2015 with English translation (6 pages).

(Continued)

*Primary Examiner* — Alan D Hutchinson
(74) *Attorney, Agent, or Firm* — Crowell & Moring LLP

(57) ABSTRACT

An object of the present invention is to provide a hybrid working vehicle that enables enhancing efficiency of an engine. A hybrid control device (35) according to the present invention includes a required power arithmetic unit (35A) that operates power required for operation of the vehicle, specified rotational speed setting equipment (35B1) that sets first rotational speed and second rotational speed which specify an operating range of the engine (12) according to required power operated by the required power arithmetic unit (35A), variable speed control equipment (35B2) that variably controls rotational speed of the engine (12) according to required power operated by the required power arithmetic unit (35A1) and electrical storage device electric (Continued)

power control equipment (35C1) that executes control over supplying electric power according to a deficit of power of the engine (12) in an electrical storage device (29) for required power operated by the required power arithmetic unit (35A) to an electric motor (26) when rotational speed of the engine (12) variably controlled by the variable speed control equipment (35B2) is first rotational speed.

1 Claim, 13 Drawing Sheets

(51) Int. Cl.
  *B60K 6/46*  (2007.10)
  *B60L 11/12*  (2006.01)
  *B60W 10/06*  (2006.01)
  *B60W 10/08*  (2006.01)
  *B60W 10/26*  (2006.01)
  *B60W 20/10*  (2016.01)
  *F02D 29/00*  (2006.01)
  *F02D 29/06*  (2006.01)
  *E02F 9/20*  (2006.01)

(52) U.S. Cl.
  CPC ............ *B60L 11/12* (2013.01); *B60W 10/06* (2013.01); *B60W 10/08* (2013.01); *B60W 10/26* (2013.01); *E02F 9/2075* (2013.01); *F02D 29/00* (2013.01); *F02D 29/06* (2013.01); *B60L 2200/40* (2013.01); *B60L 2210/10* (2013.01); *B60W 2300/17* (2013.01); *B60W 2520/10* (2013.01); *B60W 2540/10* (2013.01); *B60W 2540/12* (2013.01); *B60W 2540/18* (2013.01); *B60W 2710/0644* (2013.01); *B60W 2710/083* (2013.01); *B60W 2710/30* (2013.01); *B60Y 2200/415* (2013.01); *B60Y 2200/92* (2013.01); *B60Y 2400/112* (2013.01); *B60Y 2400/114* (2013.01); *Y02T 10/6217* (2013.01); *Y02T 10/6286* (2013.01)

(58) Field of Classification Search
  CPC .... B60K 6/28; B60K 6/26; B60K 6/46; B60L 11/12; F02D 29/00; F02D 29/06
  See application file for complete search history.

(56) References Cited

U.S. PATENT DOCUMENTS

| 2011/0098873 A1 | 4/2011 | Koga et al. |
| 2013/0149093 A1 | 6/2013 | Kaneko et al. |
| 2014/0148984 A1 | 5/2014 | Nishi et al. |
| 2014/0188320 A1 | 7/2014 | Moriki et al. |
| 2015/0267380 A1 | 9/2015 | Kaneko et al. |

FOREIGN PATENT DOCUMENTS

| JP | 11-332018 A | 11/1999 |
| JP | 2006-341848 A | 12/2006 |
| JP | 2007-332921 A | 12/2007 |
| JP | 2012-25249 A | 2/2012 |
| JP | 2013-39875 A | 2/2013 |
| JP | 2014-94590 A | 5/2014 |
| WO | WO 2009/157511 A1 | 12/2009 |

OTHER PUBLICATIONS

Japanese-language Written Opinion (PCT/ISA/237) issued in PCT Application No. PCT/JP2015/055461 dated Jun. 2, 2015 (5 pages).

\* cited by examiner

HYBRID WHEEL LOADER

TECHNICAL FIELD

The present invention relates to a hybrid working vehicle that uses an engine and an electric motor for a power source.

BACKGROUND ART

Recently, energy saving orientation for each industrial product is getting stronger in terms of environmental problems, a crude oil price hike and others. A field of working vehicles including construction vehicles that have principally used a hydraulic driving system using a diesel engine for a power source also has the trend, and cases of the enhancement of efficiency by motorization and energy saving increase.

For example, when a driving section of the above-mentioned working vehicle is motorized, multiple energy saving effects such as efficient driving of an engine (in the case of a hybrid type), the enhancement of power transmission efficiency and the recovery of regenerated power in addition to the reduction of exhaust gas can be expected. In such a field of working vehicles, the motorization of a fork lift truck makes most progress, a so-called battery fork lift truck that drives a motor using electric power of a battery is promptly practicalized prior to other vehicles, and motorization is rather popularized among working vehicles with a compact fork lift truck in the center.

Uninterruptedly, recently, in a field of a hydraulic excavator, an engine type fork lift truck and others, a "hybrid vehicle" in which a diesel engine and an electric motor are combined starts to be productized. Further, a wheel loader can be given for a vehicle for which relatively great fuel efficiency reduction effect can be expected as effect in the case of coming hybridization out of working vehicles in which correspondence to environment by motorization and energy saving advance as described above.

FIG. 12 shows one example of a configuration of a wheel loader 100 heretofore known.

As shown in FIG. 12, the wheel loader 100 according to the related art is provided with an engine 101, a torque converter 102 that transmits power of the engine 101, a transmission (T/M) 103 that shifts the power transmitted from the torque converter 102, a propeller shaft 104 connected to the transmission 103, a hydraulic pump 105 driven by the engine 101 and a hydraulic working mechanism 106 operated by pressure oil discharged from the hydraulic pump 105.

The wheel loader 100 can excavate and carry earth, sand and others with a bucket of the hydraulic working mechanism 106 on the front side for example, transmitting the power of the engine 101 to an axle by the torque converter 102 and the transmission 103 via the propeller shaft 104 and traveling. For a typical work mode of the wheel loader 100 configured as described above, V-shaped excavation work can be given.

FIG. 13 illustrates the V-shaped excavation work.

As shown in FIG. 13, first, the wheel loader 100 advances toward a target to be excavated 110 such as a pile of gravel, moves backward after gravel and others are loaded onto the bucket of the hydraulic working mechanism 106 by thrusting the bucket into the target to be excavated 110, and returns to a home position. Afterward, when an operator manipulates a steering wheel and an operating lever, the wheel loader 100 advances toward a haulage vehicle 111 such as a dump truck, lifting the bucket of the hydraulic working mechanism 106. The wheel loader 100 moves backward again after the haul is loaded onto the haulage vehicle 111, that is, after the haul is released from the bucket and returns to the home position. As described above, the wheel loader 100 repeats the V-shaped excavation work, drawing a V-shaped locus.

In the above-mentioned V-shaped excavation work, the wheel loader 100 distributes the power of the engine 101 to a traveling section and the hydraulic working mechanism 106 on the front side, travels, and performs the V-shaped excavation work. This V-shaped excavation work requires great power because in the traveling section, great tractive force is exercised, the bucket is thrust into the target to be excavated 110 and afterward, a pile of haul is scooped with the bucket of the hydraulic working mechanism 106 on the front side. Besides, as the wheel loader 100 simultaneously operates in the traveling section and the hydraulic working mechanism 106 when the wheel loader is accelerated toward the haulage vehicle 111, lifting the bucket in a state in which the haul is loaded, the wheel loader requires great power again.

Accordingly, when the wheel loader 100 performs the V-shaped excavation work which is a basic operational pattern, the increase and decrease of great power occur. When power is supplied by the engine 101 according to a load condition of the V-shaped excavation work described above, the vehicle is not necessarily operated at a satisfactory fuel efficiency point in a fuel efficiency characteristic of the engine 101 in a case that the vehicle is not driven at suitable speed of the engine 101 and consequently, the wheel loader may be "a vehicle of poor fuel efficiency". In the wheel loader 100 according to the related art provided with the above-mentioned torque converter 102 shown in FIG. 12, as the speed corresponding to a load of the engine 101 is basically determined by characteristics of the torque converter 102 and the hydraulic pump 105, the speed of the engine 101 cannot be arbitrarily set.

In the meantime, as a hybrid wheel loader has a configuration that an engine and a propeller shaft are not mechanically connected for example, engine speed can be arbitrarily varied according to an operation of the vehicle. As a secondary battery such as a lithium battery and an electrical storage device such as an electric double layer capacitor are mounted in the hybrid wheel loader, it is conceivable that the operation of the engine can be controlled by using electric power of the electrical storage device for a supply source of power required for the operation of the vehicle so that fuel efficiency of the engine is as satisfactory as possible.

For one of the related arts of this type hybrid working vehicle, there is proposed a hybrid working machine mounting a hybrid control system equipped with a first driving machine provided with only a powering function, a second driving machine provided with powering and regenerating functions, a power unit that charges regenerative energy from the second driving machine and can discharge electrical energy into the second driving machine and a controller that instructs the first driving machine to supply power up to maximum output power of the first driving machine to a load in powering, instructs the power unit to supply quantity of the load exceeding the maximum output power of the first driving machine via the second driving machine and instructs to restore regenerative energy from the load to the power unit via the second driving machine in regeneration (for example, refer to a patent literature 1).

CITATION LIST

Patent Literature

Patent Literature 1: JP-A No. 2007-332921

SUMMARY OF THE INVENTION

Technical Problem

However, the hybrid working machine according to the related art disclosed in JP-A No. 2007-332921 efficiently controls operation of an engine by supplying the quantity of the load exceeding the maximum output power of the first driving machine from the power unit, regenerating and covering regenerative energy equivalent to the quantity of the load from the load of the vehicle to the power unit, however, a method of controlling rotational speed of the engine when each load exists in the vehicle is not referred. Therefore, the hybrid working machine according to the related art has room to further improve efficiency of the engine from a viewpoint of control over rotational speed of the engine for power required for operation of the vehicle.

The present invention is made in view of actual situations of the related art described above and its object is to provide a hybrid working vehicle that enables enhancing efficiency of an engine.

Solution to Problem

To achieve the above-mentioned object, a hybrid working vehicle according to the present invention is provided with an engine, an electric motor operated by electric power, a traveling section driven by the electric motor, an electrical storage device that stores electric power supplied to the electric motor and a hybrid control device that controls a hybrid system using the engine and the electric motor for a power source, and has a characteristic that the hybrid control device includes a required power arithmetic unit that operates power required for operation of the vehicle, specified rotational speed setting equipment that sets first rotational speed and second rotational speed which specify an operating range of the engine according to power operated by the required power arithmetic unit, variable speed control equipment that variably controls rotational speed of the engine between the first rotational speed and the second rotational speed according to the power operated by the required power arithmetic unit and electrical storage device electric power control equipment that controls over supplying electric power according to a deficit in power of the engine in the electrical storage device for the power operated by the required power arithmetic unit to the electric motor when rotational speed of the engine variably controlled by the variable speed control equipment is the first rotational speed.

In the present invention configured as described above, the variable speed control equipment can operate the engine in a suitable range of rotational speed considering a fuel efficiency characteristic of the engine by variably controlling between the first rotational speed and the second rotational speed of the engine speed respectively set by the specified rotational speed setting equipment according to power required for operation of the vehicle and operated by the required power arithmetic unit. Power of the engine can be sufficiently assisted, keeping an operating state of the engine satisfactory by driving the electric motor with electric power supplied from the electrical storage device according to the electrical storage device electric power control equipment even if power of the engine is short for power required for the operation of the vehicle when rotational speed of the engine is the first rotational speed. Hereby, efficiency of the engine can be enhanced.

Besides, the hybrid working vehicle according to the present invention has a characteristic that in the present invention, the specified rotational speed setting equipment sets the first rotational speed as an upper limit of rotational speed of the engine when power operated by the required power arithmetic unit is larger than predetermined high power and sets the second rotational speed as a lower limit of rotational speed of the engine when power operated by the required power arithmetic unit is smaller than predetermined low power.

In the present invention configured as described above, as rotational speed of the engine is limited to the first rotational speed by the variable speed control equipment even if the rotational speed of the engine rises when power operated by the required power arithmetic unit is larger than the predetermined high power, loss torque caused according to high rotational speed of the engine can be reduced. In the meantime, as rotational speed of the engine is limited to the second rotational speed by the variable speed control equipment even if the rotational speed of the engine lowers when power operated by the required power arithmetic unit is smaller than the predetermined low power, excessive lowering of rotational speed of the engine can be inhibited. Hereby, accelerating torque of an output shaft of the engine required when rotational speed of the engine is raised can be reduced.

Moreover, the hybrid working vehicle according to the present invention has a characteristic that in the present invention, the electrical storage device electric power control equipment charges the electric storage device when rotational speed of the engine variably controlled by variable speed control equipment is the second rotational speed.

In the present invention configured as described above, as a load of the engine is increased by charging the electrical storage device according to the electrical storage device electric power control equipment even if rotational speed of the engine is in a state of the second rotational speed and power required for operation of the vehicle further lowers, the decrease of torque of the engine and deterioration in fuel efficiency of the engine can be inhibited.

In addition, the hybrid working vehicle according to the present invention is provided with an engine, a motor generator which is coupled to an output shaft of the engine and which assists power of the engine and generates electric power, an electric motor operated by electric power, a traveling section driven by the electric motor, an electrical storage device that stores electric power supplied to the electric motor and a hybrid control device that controls a hybrid system using the engine and the electric motor for a power source, and has a characteristic that the hybrid control device includes a required power arithmetic unit that operates power required for operation of the vehicle, specified rotational speed setting equipment that sets first rotational speed and second rotational speed which specify an operating range of the engine according to the power operated by the required power arithmetic unit, variable speed control equipment that variably controls rotational speed of the engine between the first rotational speed and the second rotational speed according to the power operated by the required power arithmetic unit and electrical storage device electric power control equipment that controls over supplying electric power according to a deficit of power of the engine in the electrical storage device for the power operated by the required power arithmetic unit to the motor generator when rotational speed of the engine variably controlled by the variable speed control equipment is the first rotational speed.

In the present invention configured as described above, the variable speed control equipment can operate the engine in a suitable rotational speed range considering a fuel efficiency characteristic of the engine by variably controlling rotational speed of the engine between the first rotational speed and the second rotational speed respectively set by the specified rotational speed setting equipment according to the power required for operation of the vehicle and operated by the required power arithmetic unit. Even if power of the engine is short for power required for operation of the vehicle when rotational speed of the engine is the first rotational speed, power of the engine can be sufficiently assisted, keeping an operating state of the engine satisfactory by driving the motor generator with electric power supplied from the electrical storage device according to the electrical storage device electric power control equipment. Hereby, efficiency of the engine can be enhanced.

Further, the hybrid working vehicle according to the present invention has a characteristic that in the present invention, the specified rotational speed setting equipment sets the first rotational speed as an upper limit of rotational speed of the engine when power operated by the required power arithmetic unit is larger than predetermined high power and sets the second rotational speed as a lower limit of rotational speed of the engine when the power operated by the required power arithmetic unit is smaller than predetermined low power.

In the present invention configured as described above, as rotational speed of the engine is limited to the first rotational speed by the variable speed control equipment even if rotational speed of the engine rises when power operated by the required power arithmetic unit is larger than the predetermined high power, loss torque caused according to high rotational speed of the engine can be reduced. In the meantime, as rotational speed of the engine is limited to the second rotational speed by the variable speed control equipment even if rotational speed of the engine lowers when power operated by the required power arithmetic unit is smaller than the predetermined low power, excessive lowering of rotational speed of the engine can be inhibited. Hereby, accelerating torque of an output shaft of the engine required when rotational speed of the engine is raised can be reduced.

Furthermore, the hybrid working vehicle according to the present invention has a characteristic that in the present invention, the electrical storage device electric power control equipment executes control over supplying electric power according to a deficit of power of the engine in the electrical storage device for power operated by the required power arithmetic unit to the motor generator when the power operated by the required power arithmetic unit is larger than the predetermined low power in a state in which rotational speed of the engine variably controlled by the variable speed control equipment is the second rotational speed.

As the present invention configured as described above enables promptly assisting power of the engine by powering the motor generator using electric power supplied from the electrical storage device according to the electrical storage device electric power control equipment even if greater power than the predetermined low power is suddenly demanded as power required for operation of the vehicle when rotational speed of the engine is the second rotational speed, shortage in power of the engine can be avoided.

Advantageous Effects of Invention

According to the hybrid working vehicle disclosed in the present invention, efficiency of the engine can be enhanced. Problems, configurations and effects except the above-mentioned those will be clarified by the description of the following embodiments.

DESCRIPTION OF EMBODIMENTS

Figure 1:
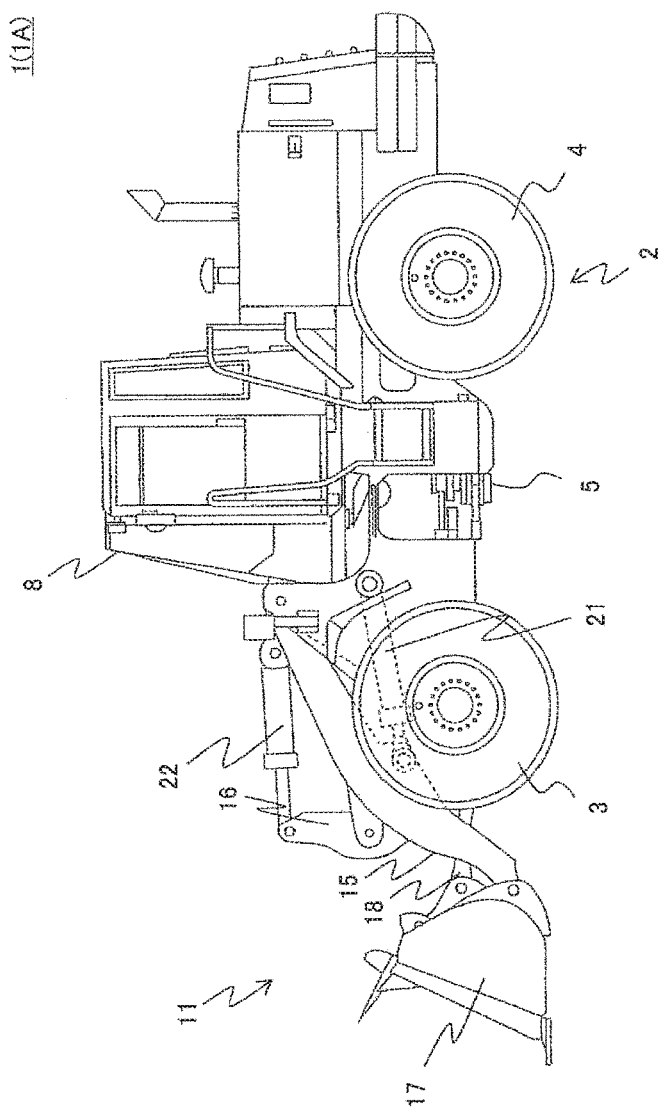
FIG. 1 shows appearance of a hybrid wheel loader given for one example of a hybrid working vehicle equivalent to this embodiment.

Referring to the drawings, embodiments of a hybrid working vehicle according to the present invention will be described below.

Figure 2:
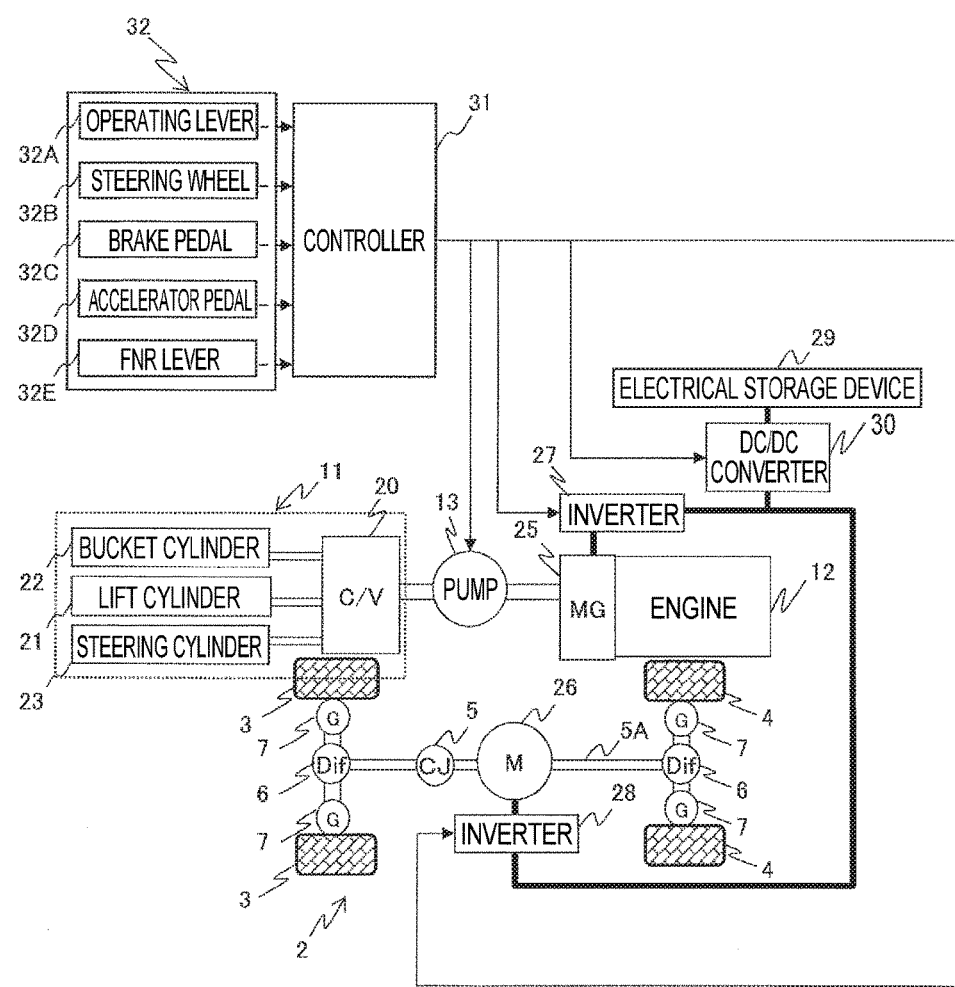
FIG. 2 shows a configuration of the wheel loader shown in FIG. 1.

The first embodiment of the hybrid working vehicle according to the present invention is applied to a hybrid wheel loader 1 shown in FIG. 1 for example. FIG. 1 shows appearance of the hybrid wheel loader 1. FIG. 2 is a block diagram showing a configuration of the inside of the hybrid wheel loader 1, a thick full line shows a power line, a thin full line shows a communication line such as a controller area network (CAN), and a thin broken line shows hard-wire.

The hybrid wheel loader 1 is an articulated vehicle steered by breaking a vehicle body in the vicinity of the center as shown in FIG. 1. The hybrid wheel loader 1 is provided with a traveling section 2 for making the vehicle travel, and the traveling section 2 is configured by a pair of front wheels 3 rotatably provided to the front of the vehicle, a pair of rear wheels 4 rotatably provided to the rear of the vehicle, a center joint (CJ) 5 that bendably couples the front and the rear of the vehicle via a propeller shaft 5A as shown in FIG. 2, differential gears (Dif) 6 which are respectively coupled to the center joint 5 is the propeller shaft 5A and which respectively distribute power transmitted to the propeller shaft 5A to right and left wheels 3, 4 and final gears (G) 7 that respectively transmit the power respectively distributed by the differential gears 6 to the wheels 3, 4 for example.

Besides, the hybrid wheel loader 1 is provided with a cab 8 arranged over the center joint 5, a hydraulic working section 11 arranged in front of the cab 8 for performing work such as excavation, loading and unloading, an engine 12 which is a power source of the traveling section 2 and the hydraulic working section 11 and a hydraulic pump 13 which is arranged to be coaxial with the engine 12 or in the vicinity of the engine, which is actuated by driving force of the engine 12 and which discharges pressure oil as shown in FIGS. 1, 2.

The hydraulic working section 11 is equipped with a lift 15 one end of which is turnably coupled to the front of the vehicle for example, a bell crank 16 turnably coupled to the lift 15, a bucket 17 attached to an end of the lift 15, a link 16 that turnably supports the bucket 17 and a control valve device (C/V) 20 that controls a flow rate and a direction of pressure oil supplied from the hydraulic pump 13.

Besides, the hydraulic working section 11 is equipped with a lift cylinder 21 both ends of which are coupled to the lift 15 and the front of the vehicle, which is extended/contracted by pressure oil supplied from the control valve device 20 and which vertically turns the lift 15, a bucket cylinder 22 both ends of which are coupled to the bell crank 16 and the front of the vehicle, which is extended/contracted by pressure oil supplied from the control valve device 20 and which vertically turns the bucket 17 and a steering cylinder 23 which is extended/contracted by pressure oil supplied from the control valve device 20 and which bends the front of the vehicle for the rear on the basis of the center joint 5 leftward or rightward.

An engine speed sensor that senses speed of the engine 12 and a discharge pressure sensor that senses discharge pressure of the hydraulic pump 13 are respectively provided to the engine 12 and the hydraulic pump 13 though the sensors are not shown. In FIG. 1, as for the lift 15 and the lift cylinder 21, only one lift and only one lift cylinder are shown, however, as to each member of these, one pair is respectively provided on lateral both sides of the bucket 17, and the duplicate description is omitted. Moreover, to facilitate the understanding of the following description, in FIG. 2, a member except the control valve device 20, the lift cylinder 21, the bucket cylinder 22 and the steering cylinder 23 in the hydraulic working section 11 is not shown.

Further, the hybrid wheel loader 1 is provided with a motor generator (M/G) 25 which is coupled to an output shaft of the engine 12, which assists power of the engine 12 and which generates electric power, an electric motor (M) 26 operated by the electric power, inverters 28, 28 that control each operation of the motor generator 25 and the electric motor 26, an electrical storage device 29 that stores electric power supplied to the electric motor 26, a DC/DC converter 30 that controls charging/discharging operation of the electrical storage device 29 and receives/supplies do power from/to each inverter 27, 28, a controller 31 that controls operation of the vehicle and a manual operating device 32 which is installed in the cab 8 and which transmits various instruction signals to the controller 31 according to the operation of the operator in the cab 8 as shown in FIG. 2. A voltage sensor that senses voltage of the electrical storage device 29 is provided to the electrical storage device 29 though the voltage sensor is not shown.

The motor generator 25 is arranged to be coaxial with the engine 12 or in the vicinity and is rigidly connected to the engine 12 and a shaft of the hydraulic pump 13. That is, the motor generator 25 shares a rotation axis with the engine 12 and the hydraulic pump 13, and is connected to them via a gear (not shown) and others so that each rotational speed is mutually set to predetermined proportional relation. When the motor generator 25 is driven by the engine 12 and is operated as a generator, generated electric power is stored in the electrical storage device 29.

In the meantime, the motor generator 25 can assist the power of the engine 12 by being operated as an electric motor utilizing electric power stored in the electrical storage device 29. The electric motor 26 is arranged on the propeller shaft 5A and is respectively coupled to the front wheels 3 and the rear wheels 4 via the differential gears 6 and the final gears 7. Accordingly, the electric motor 26 rotates a total of four wheels of the front wheels 3 and the rear wheels 4 via the differential gears 6 and the final gears 7 by rotating the propeller shaft 5A. For the electrical storage device 29, an electrical storage device having relatively large electric capacity is desirable and the electrical storage device is configured by a secondary battery such as a lithium battery and an electric double layer capacitor for example.

The manual operating device 32 is configured by an operating lever 32A for operating the lift 15 and the bucket 17, a steering wheel 32B for directing a lateral traveling direction of the vehicle, a brake pedal 32C that brakes the traveling of the vehicle, an accelerator pedal 32D for accelerating the vehicle and an FNR lever 32E for directing a longitudinal traveling direction of the vehicle, and each instruction signal input from the operating lever 32A, the steering wheel 32B, the brake pedal 32C, the accelerator pedal 32D and the FNR lever 32E is input to the controller 31 as an electric signal.

The control valve device 20 is configured by a selector valve for the lift cylinder connected to the lift cylinder 21, a selector valve for the bucket cylinder connected to the bucket cylinder 22 and a selector valve for the steering cylinder connected to the steering cylinder 23 for example though the selector valves are not shown, and a changeover method of each selector valve complies with a solenoid controlled pilot operated type. Accordingly, the control valve device 20 extends or contracts the lift cylinder 21 and the bucket cylinder 22 at desired operating speed by changing each changeover position and each changeover amount of the selector valve for the lift cylinder and the selector valve for the bucket cylinder according to a manipulated variable of the operating lever 32A when the control valve device receives an instruction signal from the operating lever 32A. Hereby, the lift 15 and the bucket 17 are vertically turned by the operation of the operating lever 32A. At this time, excavation and loading/unloading work can be efficiently performed by suitably combining a traveling function if necessary.

In the meantime, the control valve device 20 extends or contracts the steering cylinder 23 by changing a changeover position of the selector valve for the steering cylinder according to a manipulated variable of the steering wheel 32B when the control valve device receives an instruction signal via the controller 31 from the steering wheel 32B. Hereby, the vehicle travels leftward or rightward by the operation during traveling of the steering wheel 32B. The FNR lever 32E switches a traveling condition of the vehicle to any of forward F, neutral N and retrogression R, the vehicle is made to advance or to retrogress by suitably operating the accelerator pedal 32D and the brake pedal 32C in a state in which the changeover position of the FNR lever 32E is selected in a position of forward F or retrogression R, and traveling speed of the vehicle can be controlled.

As described above, the hybrid wheel loader 1 according to the first embodiment of the present invention has a configuration generally called a series type, the engine 12 and the electric motor 26 are not mechanically connected, and rotational speed of the engine 12 can be arbitrarily controlled to a certain extent for the operation of the vehicle. In the first embodiment of the present invention, the case that the present invention is applied to the series type hybrid wheel loader 1 for one example of the hybrid working vehicle is described, however, if only the following configuration is a configuration that the rotational speed of the engine 12 is not defined according to a condition of a load, the present invention may be also applied to a configuration except the above-mentioned configuration.

The hybrid wheel loader 1 configured as described above performs work according to a purpose by operating the hydraulic pump 13 by the power of the engine 12 and supplying pressure oil discharged from the hydraulic pump 13 to each cylinder 21 to 23 of the hydraulic working section 11. In the meantime, the hybrid wheel loader 1 performs traveling operation of the vehicle by driving the electric motor 26 by electric power generated by the motor generator 25 by the power of the engine 12. At that time, the electrical storage device 29 contributes to the reduction of energy consumption of the vehicle by the engine 12 by assisting power required for absorption of regenerated electric power in braking the vehicle and the operation of the vehicle.

In the hybrid wheel loader 1, great increase/decrease of power is caused when V-shaped excavation work which is a basic operational pattern is performed. For operation that requires great power, operation that great tractive force is exercised and a target to be excavated is thrusted and so-called compound operation that the vehicle is accelerated, lifting the hydraulic working section 11 are equivalent. In the meantime, operation that the vehicle moves backward to return to a home position and stops after a haul is loaded onto the bucket 17 in the V-shaped excavation work or a haul on the bucket 17 is released hardly requires power and conversely, as traveling of the vehicle is braked, regenerated energy can be recovered from the electric motor 26 to the electric storage device 29.

Accordingly, when the vehicle is not driven at suitable engine speed in a case that power is supplied by the engine 12 according to a load condition that greatly varies in the V-shaped excavation work, the vehicle is not necessarily operated at a satisfactory fuel efficiency point in a fuel efficiency characteristic of the engine 12 and consequently, the vehicle may be "a vehicle of poor fuel efficiency".

Figure 3:
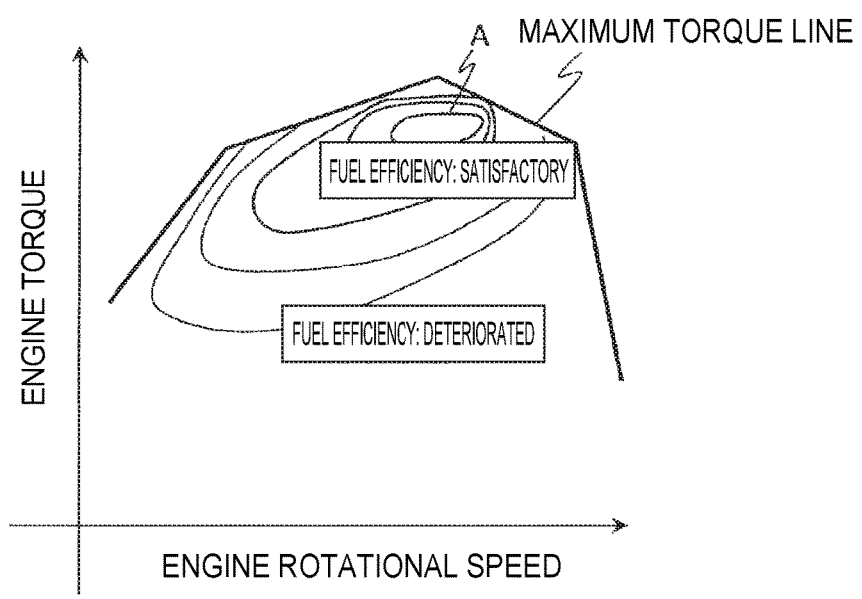
FIG. 3 shows one example of specific fuel efficiency characteristics of a general diesel engine.

FIG. 3 is a reference diagram for explaining the above-mentioned fuel efficiency characteristic of the engine 12 and shows one example of specific fuel efficiency characteristics of not a specific diesel engine but a general diesel engine.

As shown in FIG. 3, in the fuel efficiency characteristics (torque-engine speed regions) of the general diesel engine, fuel efficiency is the most satisfactory in a region A of a part and each region of equal fuel efficiency extends in a circle with the region A in the center. Therefore, in the fuel efficiency characteristics of the diesel engine, the fuel efficiency of the diesel engine is deteriorated farther from the region A.

Figure 12:
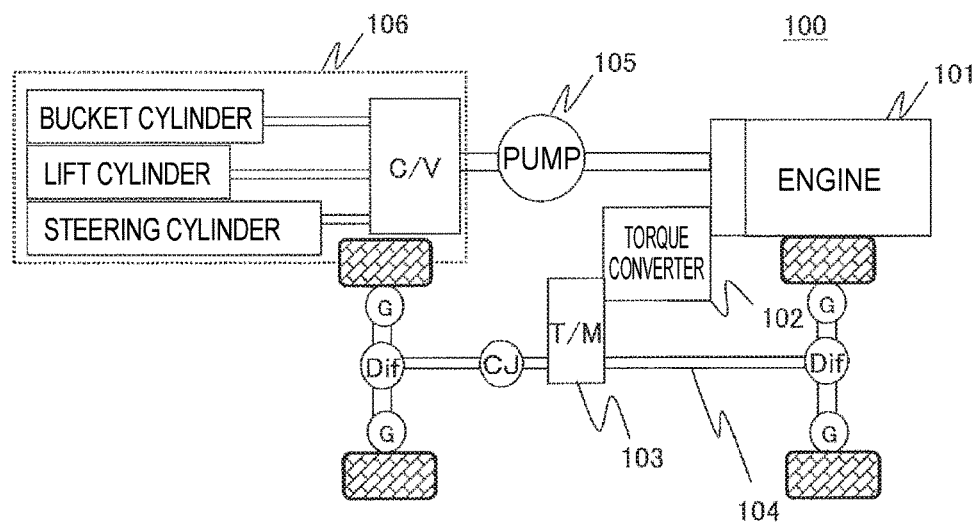
FIG. 12 shows a configuration of a wheel loader according to the related art.
Figure 13:
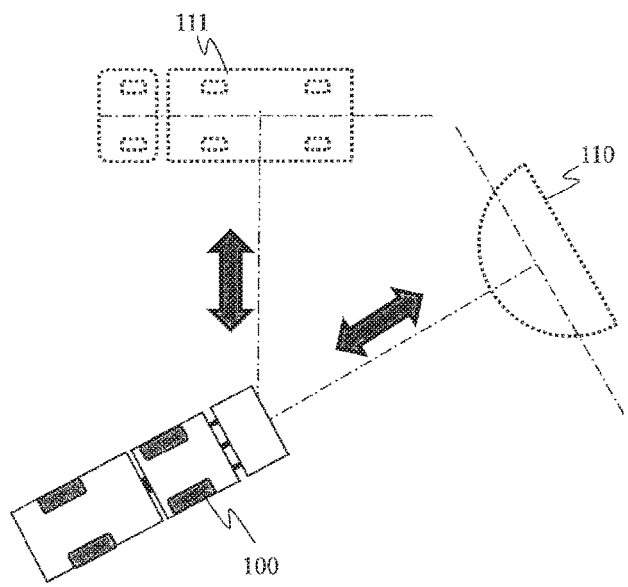
FIG. 13 illustrates V-shaped excavation work performed by the wheel loader shown in FIG. 12.
Figure 14:
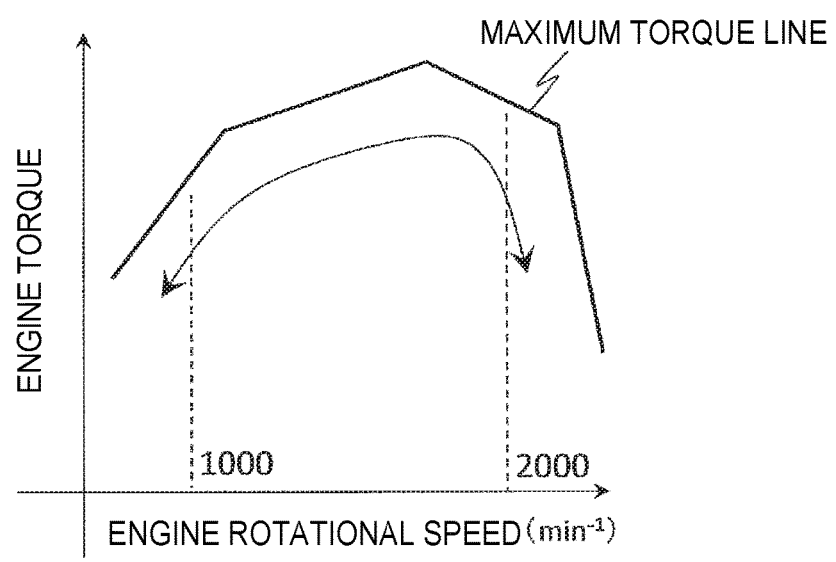
FIG. 14 shows an operating characteristic of an engine of the wheel loader shown in FIG. 12.

FIG. 14 shows operating characteristics of an engine 101 of a wheel loader 100 according to the related art shown in FIG. 12 as a comparative example of operating characteristics of the engine 12 of the hybrid wheel loader 1 in the V-shaped excavation work.

As shown in FIG. 14, in the wheel loader 100 according to the related art, as the rotational speed of the engine 101 cannot be arbitrarily set because a hydraulic pump 105, a torque converter 102 and a transmission (T/M) 103 which are respectively a load are mechanically connected to the engine 101, engine speed may lower up to rotational speed lower than 1000 min$^{-1}$ according to characteristics of the torque converter 102 and the hydraulic pump 105 when power required for the operation of the vehicle is small, and when power required for the operation of the vehicle is great, engine speed may rise up to rotational speed higher than 2000 min$^{-1}$.

Generally, as rotational speed of an engine of a vehicle provided with a torque converter is basically determined according to a torque characteristic (a characteristic that torque is proportional to difference between input-output rotational speeds) of the torque converter, the rotational speed of the engine is required to be increased when torque is increased and when the torque is reduced, the rotational speed of the engine is required to be reduced.

Accordingly, considering the characteristic shown in FIG. 3 of the general diesel engine, an operational locus of the engine 101 does not necessarily pass the satisfactory region in fuel efficiency in the fuel efficiency characteristic of the engine 101 in the wheel loader 100 according to the related art shown in FIG. 12. Especially, when the engine 101 is operated at high rotational speed (for example, 2000 min$^{-1}$ or more), reasonable loss torque is caused and when low rotational speed is restored to normal rotational speed (for example, 1500 min$^{-1}$) after the engine 101 is operated at the low rotational speed (for example, 1000 min$^{-1}$ or below it), accelerating torque of an output shaft itself of the engine 101 is required, and consequently, extra fuel is consumed.

In the meantime, as the hybrid wheel loader 1 according to the first embodiment of the present invention can control rotational speed of the mounted engine 12 as described above, compared with the wheel loader 100 according to the related art, the fuel efficiency of the vehicle can be greatly enhanced by controlling the operation of the engine 12 in consideration of the following three items, utilizing the fuel efficiency characteristic of the engine 12.

(1) The rotational speed of the engine 12 should be controlled in the satisfactory region in relation to fuel efficiency in the fuel efficiency characteristic of the engine 12 for power required for the operation of the vehicle.

(2) An upper limit should be set to the rotational speed of the engine 12 so as to reduce loss torque caused by high rotational speed of the engine 12.

(3) A lower limit should be set to the rotational speed of the engine 12 so as to reduce accelerating torque required when low rotational speed of the engine 12 is restored to normal rotational speed after the engine 12 is operated at the low rotational speed.

Figure 4:
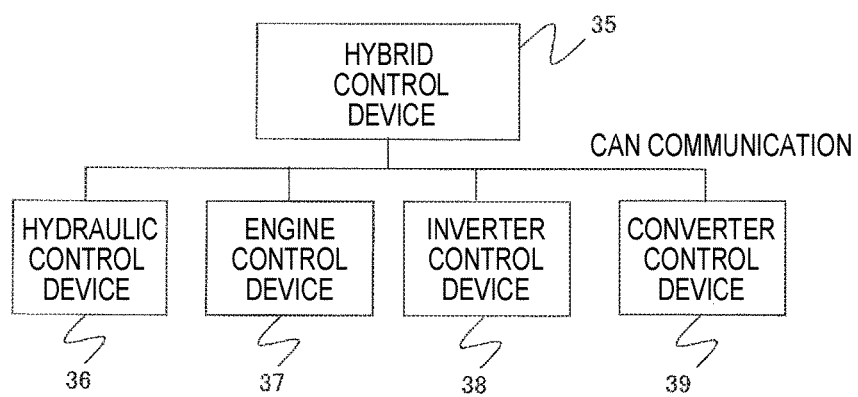
FIG. 4 shows control devices that configure a controller shown in FIG. 2.

Then, in the first embodiment of the present invention, the controller 31 of the hybrid wheel loader 1 controls the engine 12 utilizing the electrical storage device 29, and is provided with a hybrid control device 35 that controls a hybrid system using the engine 12 and the electric motor 26 for a power source, a hydraulic control device 36 that controls operation of the whole hydraulic equipment including the hydraulic pump 13 and the control valve device 20, an engine control device 37 that controls the operation of the engine 12, an inverter control device 38 that controls each operation of the inverters 27, 28 and a converter control device 39 that controls operation of the DC/DC converter 30 as shown in FIG. 4 for example.

Each control device 35 to 39 is a device required for controlling each driving section of the hybrid system, is connected using CAN communication and others, and mutually transmits/receives an instruction value and a state function of each device. Control devices (not shown) for a monitor and an information system are provided to the hybrid wheel loader 1 in addition to the above-mentioned each control device 35 to 39, however, as these control devices do not have direct relation to the present invention, the description and illustration are omitted.

The hybrid control device 35 is located in high order of the hydraulic control device 36, the engine control device 37, the inverter control device 38 and the converter control device 39, controls each control device 36 to 39, and outputs an instruction related to concrete operation to each control device 36 to 39 so that the hybrid system exercises the upmost performance. Each control device 36 to 39 is not necessarily separate from another control device, and two or more control functions may be also installed in certain one control device.

Figure 5:
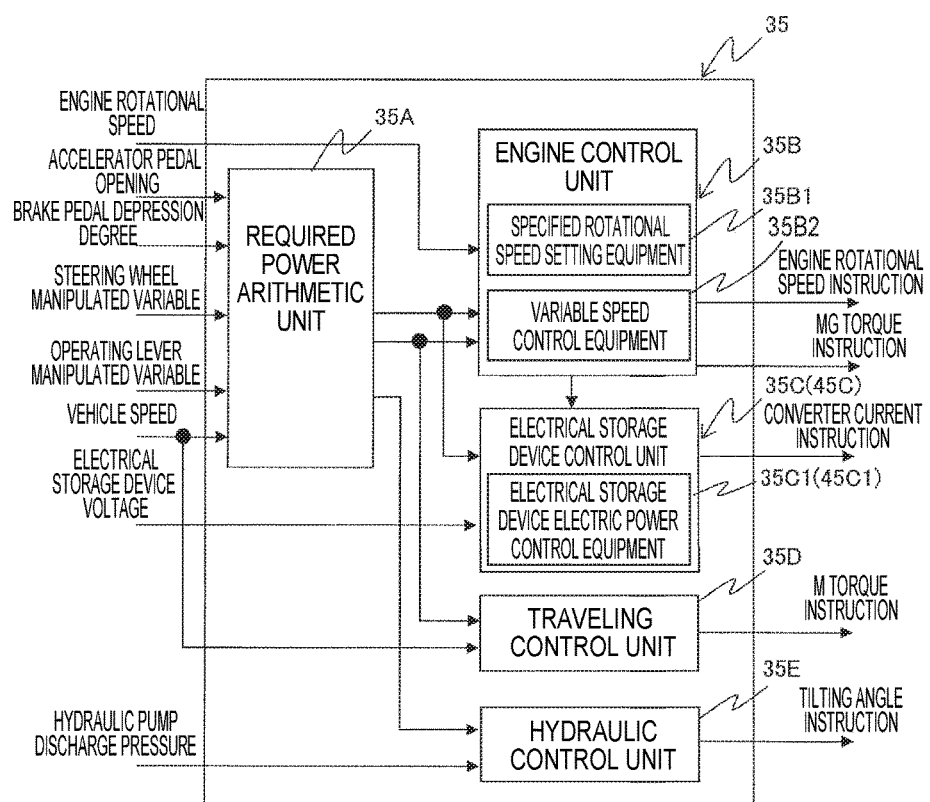
FIG. 5 shows a configuration of the hybrid control device shown in FIG. 4.

FIG. 5 shows a concrete configuration showing the hybrid control device 35 and the configuration will be described in detail below.

As shown in FIG. 5, the hybrid control device 35 includes a required power arithmetic unit 35A that operates power (hereinafter called required power for convenience) required for the operation of the vehicle, an engine control unit 35B that controls the rotational speed of the engine 12, an electrical storage device control unit 35C that controls the operation of the electrical storage device 29, a traveling control unit 35D that controls the operation of the traveling section 2 and a hydraulic control unit 35E that controls the operation of the hydraulic pump 13.

Figure 6:
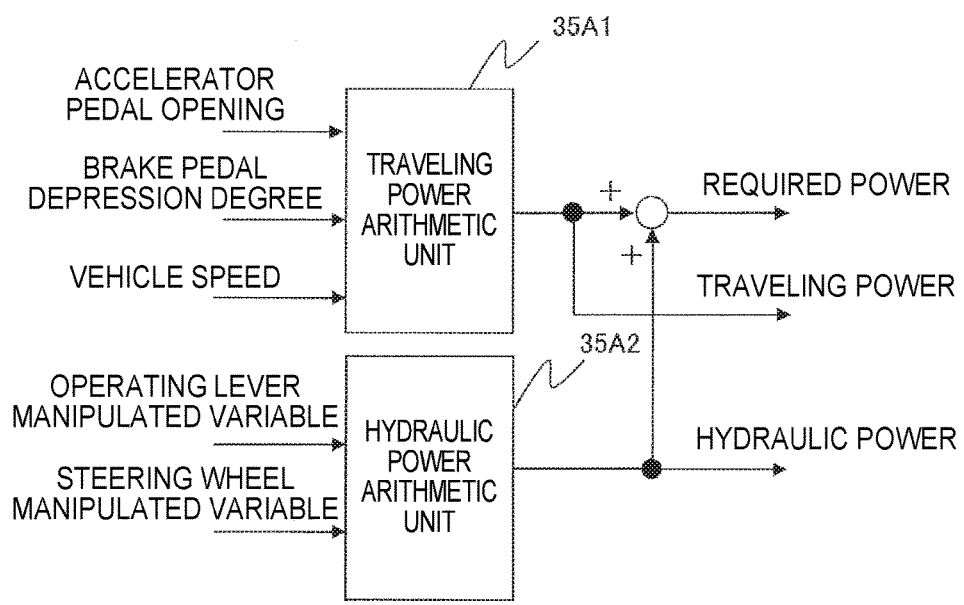
FIG. 6 shows a configuration of a required power arithmetic unit shown in FIG. 5.

The required power arithmetic unit 35A operates required power on the basis of an accelerator pedal opening which is an opening of the accelerator pedal 32D, a depression degree of the brake pedal 32C, a manipulated variable of the operating lever 32A, a manipulated variable of the steering wheel 32B and vehicle speed. Concretely, the required power arithmetic unit 35A is provided with a traveling power arithmetic unit 35A1 that operates power (hereinafter called traveling power for convenience) required for traveling operation of the traveling section 2 and a hydraulic power arithmetic unit 35A2 that operates power (hereinafter called hydraulic power for convenience) required for the operation of the hydraulic working section 11 as shown in FIG. 6 for example.

The traveling power arithmetic unit 35A1 operates traveling power on the basis of an accelerator pedal opening, a brake pedal depression degree and vehicle speed. Besides, the operation of traveling power by the traveling power arithmetic unit 35A1 is not limited to this case, for example, may be also performed as a map search using each input value for an argument or a function is defined for each input value, and the operation of traveling power may be also performed on the basis of the defined function.

The hydraulic power arithmetic unit 35A2 operates hydraulic power on the basis of a manipulated variable of the operating lever 32A and a manipulated variable of the steering wheel 32B. The operation of hydraulic power by the hydraulic power arithmetic unit 35A2 is not limited to this case, for example, a characteristic of hydraulic power for an input value is defined, and the operation of hydraulic power may be also performed as a map search or may be also performed using an arithmetic expression expressing the characteristic of hydraulic power.

The required power arithmetic unit 35A operates required power by adding the traveling power operated by the traveling power arithmetic unit 35A1 and the hydraulic power operated by the hydraulic power arithmetic unit 35A2. As for the accelerator pedal opening, the brake pedal depression degree, the manipulated variable of the operating lever 32A and the manipulated variable of the steering wheel 32B, the controller 31 may also calculate on the basis of input values input from the accelerator pedal 32D, the brake pedal 32C, the operating lever 32A and the steering wheel 32B, and sensors that sense an accelerator pedal opening, a brake pedal depression degree, a manipulated variable of the operating lever 32A and a manipulated variable of the steering wheel 321B may be also separately provided. Besides, for information of vehicle speed, the controller 31 may also calculate on the basis of an instruction value to the electric motor 26 or a sensor that senses vehicle speed may be also separately provided.

The engine control unit 35B is connected to an engine speed sensor, the required power arithmetic unit 35A, the electrical storage device control unit 35C, the engine control device 37 and the inverter control device 38 as shown in FIG. 5. The engine control unit 35B is provided with specified rotational speed setting equipment 35B1 that sets first rotational speed E1 and second rotational speed E2 which specify an operating range of the engine 12 according to required power operated by the required power arithmetic unit 35A and variable speed control equipment 35B2 that variably controls rotational speed of the engine 12 between the first rotational speed E1 and the second rotational speed E2 according to required power operated by the required power arithmetic unit 35A. Besides, the engine control unit 35B operates power (hereinafter called engine output power for convenience) output from the engine 12 according to required power operated by the required power arithmetic unit 35A.

The electrical storage device control unit 35C is connected to a voltage sensor, the required power arithmetic unit 35A and the converter control device 39. The electrical storage device control unit 35C is provided with electrical storage device electric power control equipment 35C1 that controls so that electric power in the electrical storage device 29 according to a deficit of power of the engine 12 for required power operated by the required power arithmetic unit 35A is supplied to the electric motor 26 when rotational speed of the engine 12 variably controlled by the variable speed control equipment 35B2 is the first rotational speed E1.

Besides, the electrical storage device control unit 35C determines a converter current instruction for specifying current supplied to the DC/DC converter 30 on the basis of difference between required power operated by the required power arithmetic unit 35A and engine output power operated by the engine control unit 35B and voltage of the electrical storage device 29 sensed by the voltage sensor, and outputs the converter current instruction to the converter control device 39.

The specified rotational speed setting equipment 35B1 sets the first rotational speed E1 as an upper limit of rotational speed of the engine 12 when required power operated by the required power arithmetic unit 35A is larger than predetermined high power (1800 $min^{-1}$ in this embodiment), and sets the second rotational speed E2 as a lower limit of the rotational speed of the engine 12 when required power operated by the required power arithmetic unit 35A is smaller than predetermined low power (1000 min$^{-1}$ in this embodiment).

In this case, the predetermined high power means power equivalent to the upper limit of the rotational speed of the engine 12 for example, this power means power which can acquire a satisfactory fuel efficiency point at that rotational speed when the upper limit of the rotational speed of the engine 12 is set, and for example, this power is equivalent to power similar to rated output of the engine 12 or power slightly smaller than the above-mentioned power and relatively higher than power equivalent to normal rotational speed of the engine 12.

Besides, the predetermined low power means power equivalent to the lower limit of the rotational speed of the engine 12 for example, this power means power to an extent that rotational speed of the engine 12 does not excessively lower when the lower limit of the rotational speed of the engine 12 is set, for example, when the variable speed control equipment 35B2 variably controls rotational speed of the engine 12, this power is equivalent to target power in output at the lower limit of rotational speed of the engine 12, and this power is equivalent to power relatively lower than power equivalent to normal rotational speed of the engine 12.

The variable speed control equipment 35B2 determines an engine speed instruction in which rotational speed of the engine 12 is specified in a range between the first rotational speed E1 and the second rotational speed E2 according to required power operated by the required power arithmetic unit 35A, and outputs the engine speed instruction to the engine control device 37. Besides, the variable speed control equipment 35B2 determines an MG torque instruction in which torque of the motor generator 25 is specified on the basis of difference between the rotational speed of the engine 12 in the engine speed instruction and rotational speed of the engine 12 sensed by an engine speed sensor, and outputs the MG torque instruction to the inverter control device 38.

Figure 7:
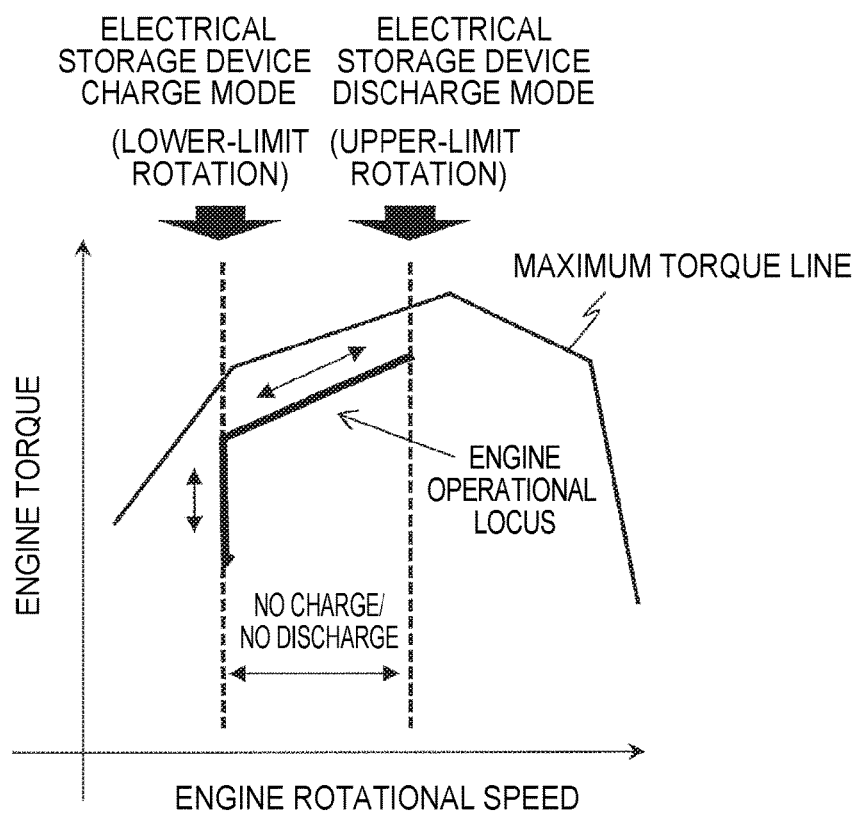
FIG. 7 shows an operating characteristic of an engine the speed of which is variably controlled by variable speed control equipment shown in FIG. 5.

Referring to FIG. 7, the operation of the engine 12 controlled by the variable speed control equipment 35B2 will be described below. In FIG. 7, a thin full line shows maximum torque and a thick full line shows an operational locus of the engine 12.

As shown in FIG. 7, when the first rotational speed E1 and the second rotational speed E2 are set by the specified rotational speed setting equipment 35B1, rotational speed of the engine 12 is limited up to the first rotational speed E1 by the variable speed control equipment 35B2 in a case that required power operated by the required power arithmetic unit 35A is larger than the predetermined high power, the engine 12 is never operated at higher rotational speed than the first rotational speed E1, and the engine 12 is operated at the first rotational speed E1. Electric power according to a deficit of power of the engine 12 for the required power is supplied from the electrical storage device 29 to the electric motor 26 by the electrical storage device electric power control equipment 35C1 and the power of the engine 12 can be assisted by the electric motor 26.

At this time, the motor generator 25 is not operated as a generator by performing zero torque control for example or by setting PWM of the inverter 27 as off and as no electric power is supplied from the motor generator 25 to the electric motor 26, the hydraulic working section 11 is operated by only engine output power, and the electric motor 26 is driven by only power (hereinafter called electrical storage device output power for convenience) output from the electrical storage device 29. Assistance by the electric motor 26 an power of the engine 12 is performed only when the electrical storage device output power is larger than power required by the electric motor 26. As described above, a path on which the electrical storage device output power is transmitted to the electric motor 26 is the most efficient path as a power transmitted path and optimum engine 12 control can be made.

Figure 8:
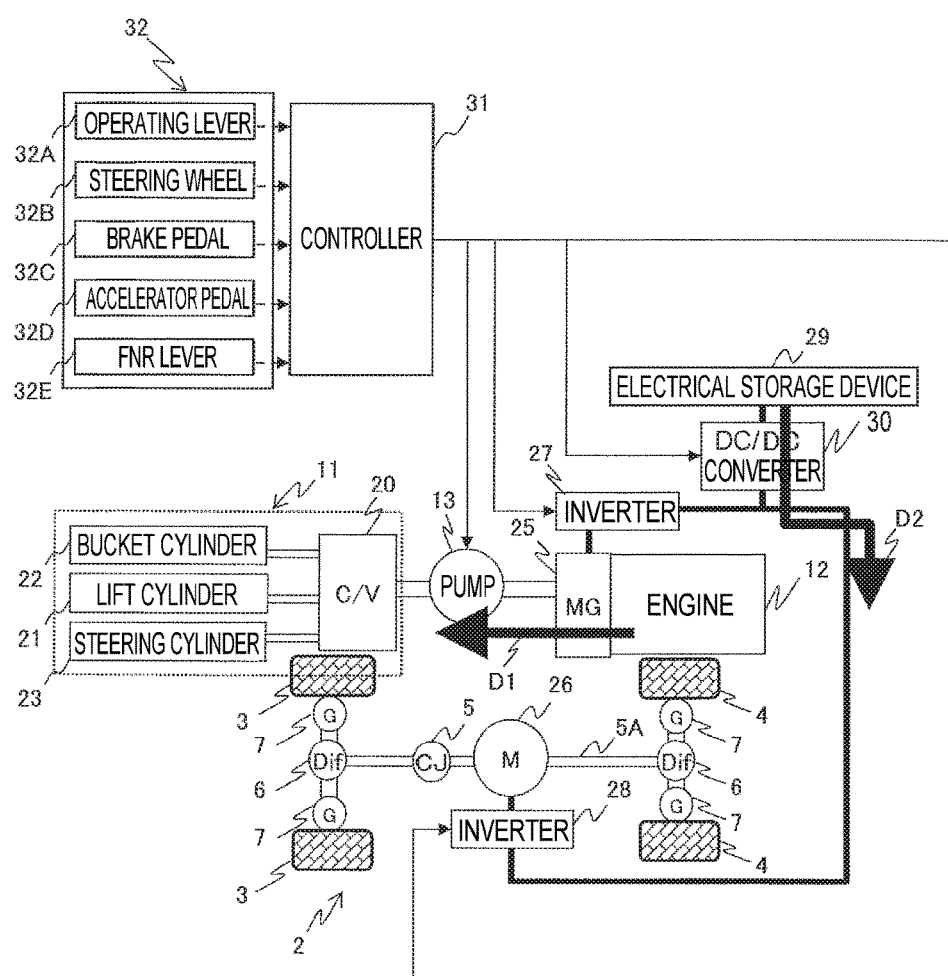
FIG. 8 shows a flow of power output from the engine and an electrical storage device shown in FIG. 2.

Accordingly, as shown in FIG. 8, as the engine output power is transmitted on the side of the hydraulic working section 11 (in a D1 direction) and the electric storage device output power is transmitted on the side of the traveling section 2 (in a D2 direction), the hydraulic working section 11 and the traveling section 2 can be efficiently driven. If the electrical storage device output power is smaller than power required by the electric motor 26, the electrical storage device 29 is charged by operating the motor generator 25 by the engine 12 as a generator.

In the meantime, when required power operated by the required power arithmetic unit 35A is smaller than the predetermined low power, rotational speed of the engine 12 is controlled to be the second rotational speed E2 by the variable speed control equipment 35B2, the engine 12 is not operated at lower rotational speed than the second rotational speed E2, and the engine 12 is operated at the second rotational speed E2. At this time, when the required power more reduces, fuel efficiency of the engine 12 is deteriorated considering the characteristic of the general diesel engine shown in FIG. 3 because torque of the engine 12 reduces in a state in which rotational speed of the engine 12 is the second rotational speed E2.

Then, the electrical storage device electric power control equipment 35C1 instructs to charge the electrical storage device 29 when rotational speed of the engine 12 variably controlled by the variable speed control equipment 35B2 is the second rotational speed E2. Hereby, as a load of the engine 12 increases by operating the motor generator 25 by the engine 12 as a generator, torque of the engine 12 decreases and the deterioration of fuel efficiency of the engine 12 can be inhibited, fuel efficiency performance of the engine 12 can be kept satisfactory.

The traveling control unit 35D is connected to the required power arithmetic unit 35A and the inverter control device 38. The traveling control unit 35D determines an M torque instruction to specify torque of the electric motor 26 on the basis of vehicle speed and traveling power operated by the traveling power arithmetic unit 35A1, and outputs the M torque instruction to the inverter control device 38.

The hydraulic control unit 35E is connected to a discharge pressure sensor and the hydraulic control device 36. The hydraulic control unit 35E determines a tilting angle instruction to specify a tilting angle of the hydraulic pump 13 on the basis of discharge pressure sensed by the discharge pressure sensor of the hydraulic pump 13 and hydraulic power operated by the hydraulic power arithmetic unit 35A2 and outputs this tilting angle instruction to the hydraulic control device 36.

Next, a flow of control operation of the controller 31 will be described referring to a flowchart shown in FIG. 9.

Figure 9:
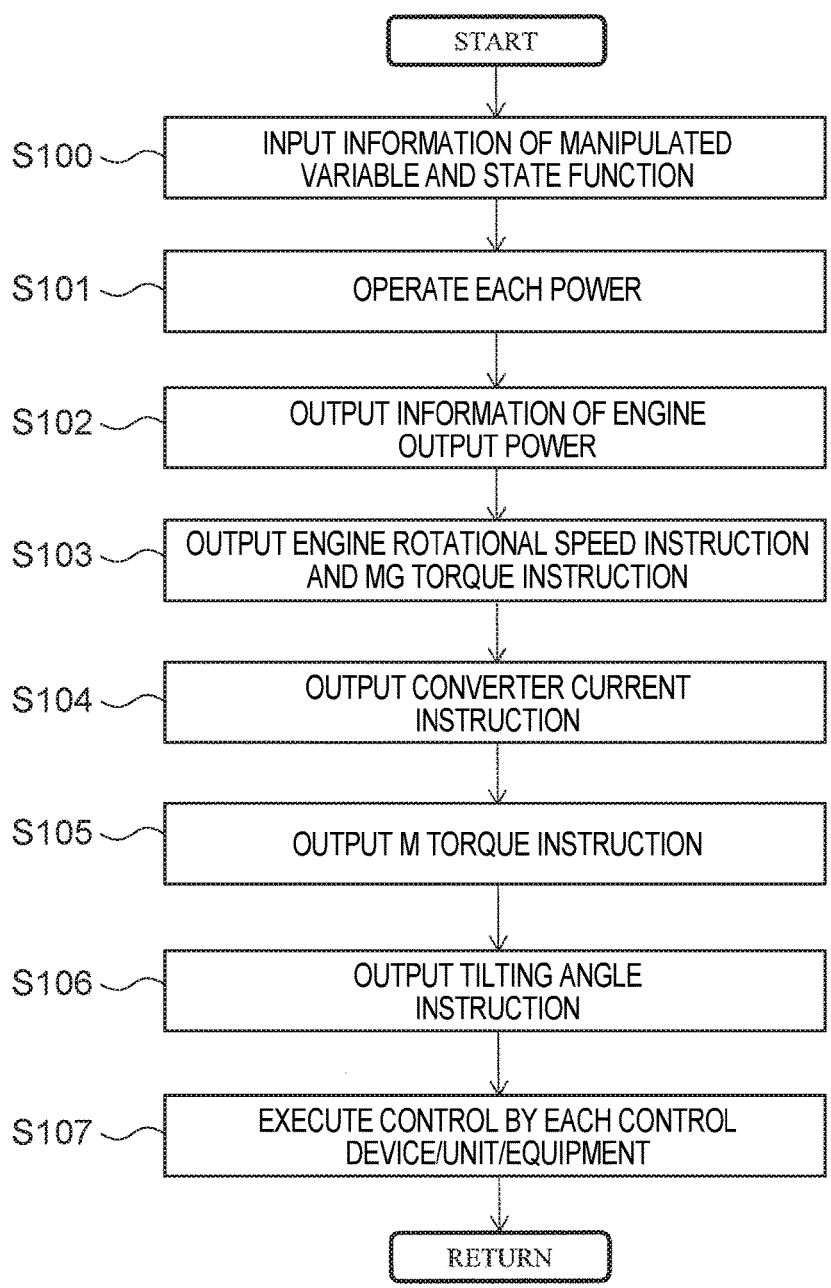
FIG. 9 is a flowchart for explaining control operation of the controller shown in FIG. 2.

First, as shown in FIG. 9, the hybrid control device 35 in the controller 31 inputs various manipulated variables including an accelerator pedal opening, a brake pedal depression degree, a manipulated variable of the operating lever 32A and a manipulated variable of the steering wheel 32B, and inputs various state functions including rotational speed of the engine 12, vehicle speed, voltage of the electrical storage device 29 and discharge pressure of the hydraulic pump 13 (a step (hereinafter called S) 100).

Next, the traveling power arithmetic unit 35A1 of the required power arithmetic unit 35A in the hybrid control device 35 inputs an accelerator pedal opening, a brake pedal depression degree and vehicle speed, operates traveling power, and outputs it to the engine control unit 35B and the electrical storage device control unit 35C (S101). Besides, the hydraulic power arithmetic unit 35A2 of the required power arithmetic unit 35A inputs a manipulated variable of the operating lever 32A and a manipulated variable of the steering wheel 32B, operates hydraulic power, and outputs it to the hydraulic control unit 35E (S101). Further, the required power arithmetic unit 35A operates required power on the basis of the traveling power and the hydraulic power respectively acquired and outputs it to the engine control unit 35B and the electrical storage device control unit 35C (S101).

Next, the engine control unit 35B operates engine output power when the engine control unit receives information of the rotational speed of the engine 12, the required power and the traveling power from the engine speed sensor and the required power arithmetic unit 35A, and outputs information of the engine output power to the electrical storage device control unit 35C (S102). Afterward, the specified rotational speed setting equipment 35B1 of the engine control unit 35B sets the first rotational speed E1 and the second rotational speed E2. The variable speed control equipment 35B2 of the engine control unit 35B determines an engine speed instruction, outputs it to the engine control device 37, determines an MG torque instruction, and outputs it to the inverter control device 38 (S103).

Next, the electrical storage device control unit 35C receives information of the voltage of the electrical storage device 29, the required power and the engine output power from the voltage sensor, the required power arithmetic unit 35A and the engine control unit 35B, determines a converter current instruction, and outputs it to the converter control device 39 (S104). Afterward, the traveling control unit 35O) inputs information of the vehicle speed, receives information of the traveling power from the traveling power arithmetic unit 35A1, determines an M torque instruction, and outputs it to the inverter control device 38 (S105). Next, the hydraulic control unit 35E receives information of the discharge pressure of the hydraulic pump 13 and the hydraulic power from the discharge pressure sensor and the hydraulic power arithmetic unit 35A2, determines a tilting angle instruction, and outputs it to the hydraulic control device 36 (S106). Next, operation in S107 is performed.

That is, in S107, the engine control device 37 receives the engine speed instruction from the engine control unit 35B and controls rotational speed of the engine 12 on the basis of the engine speed instruction. Besides, in S107, the inverter control device 38 receives the MG torque instruction from the engine control unit 35B and controls torque of the motor generator 25 on the basis of the MG torque instruction.

Further, in S107, the converter control device 39 receives the converter current instruction from the electrical storage device control unit 35C and controls output of the electrical storage device 29 via the DC/DC converter 30 on the basis of the converter current instruction. At this time, the converter control device 39 instructs the electrical storage device 29 to discharge when a sigh of the converter current instruction is positive for example, instructs the electrical storage device 29 to charge when the sign of the converter current instruction is negative, and when the sign of the converter current instruction is zero (0), charge/discharge of the electrical storage device 29 is not performed.

For a concrete example, as one operating condition of the manual operating device 32, when required power is 120 kW and engine output power is 100 kW for example, the converter control device 39 controls over the DC/DC converter 30 so as to output 20 kW which is difference between the required power and the engine output power from the electrical storage device 29. At this time, as for 20 kW of the power output from the electrical storage device, as the sign of the converter current instruction is positive, the electrical storage device 29 discharges.

Besides, in S107, the hydraulic control device 36 receives the tilting angle instruction from the hydraulic control unit 35E and controls a tilting angle of the hydraulic pump 13 on the basis of the tilting angle instruction. When operation in S107 is performed, the above-mentioned operation from S100 is repeated.

According to the hybrid wheel loader 1 according to the first embodiment of the present invention configured as described above, when the variable speed control equipment 35B2 of the engine control unit 35B performs variable speed control according to the required power operated by the required power arithmetic unit 35A so that rotational speed of the engine 12 is between the first rotational speed E1 and the second rotational speed E2 respectively set by the specified rotational speed setting equipment 35B1 of the engine control unit 35B, the engine 12 can be operated in a satisfactory region in fuel efficiency in the fuel efficiency characteristic of the engine 12.

When rotational speed of the engine 12 is the first rotational speed E1, power of the engine 12 can be sufficiently assisted, keeping an operated state of the engine 12 satisfactory by driving the electric motor 26 with electric power supplied from the electrical storage device 29 according to the electric storage device electric power control equipment 35C1 of the electrical storage device control unit 35C even if power of the engine 12 is short for required power. Hereby, as the efficiency of the engine 12 can be enhanced, the fuel efficiency of the engine 12 can be enhanced.

Especially, the hybrid wheel loader 1 can suitably distribute power acquired from the engine 12 and the electrical storage device 29 to the hydraulic working section 1 and the traveling section 2 by mechanically separating the engine 12 and the propeller shaft 5A, operating the hydraulic working section 11 using engine output power and operating the traveling section 2 using power output from the electrical storage device. Accordingly, compared with a case that electric power of the electrical storage device 29 is supplied to the motor generator 25, power of the engine 12 is assisted and the hydraulic working section 11 is operated, loss of electrical storage device output power equivalent to conversion efficiency of power of the motor generator 25 including the inverter 27 can be prevented from being caused. Hereby, the hybrid system having high power efficiency can be realized.

Besides, in the hybrid wheel loader 1 according to the first embodiment of the present invention, as the first rotational speed E1 is set as the upper limit of the rotational speed of the engine 12 by the specified rotational speed setting equipment 35B1 when required power operated by the required power arithmetic unit 35A is larger than the predetermined high power, rotational speed of the engine 12 is inhibited to be the first rotational speed E1 or lower by the variable speed control equipment 35B2 and loss torque caused by high rotational speed of the engine 12 can be reduced.

In the meantime, as the second rotational speed E2 is set as the lower limit of the rotational speed of the engine 12 by the specified rotational speed setting equipment 35B1 when required power operated by the required power arithmetic unit 35A is smaller than the predetermined low power, rotational speed of the engine 12 is never made lower than the second rotational speed E2 by the variable speed control equipment 35B2, and an excessive decline of rotational speed of the engine 12 can be inhibited. Hereby, accelerating torque of the output shaft of the engine 12 required when rotational speed of the engine 12 is increased can be reduced. As described above, as the hybrid wheel loader 1 according to the first embodiment of the present invention can realize control over rotational speed of the engine 12 considering the fuel efficiency characteristic shown in FIG. 3 for required power, effectively utilizing the electric power of the electrical storage device 29, it can further improve the fuel efficiency of the vehicle.

Second Embodiment

A second embodiment of the present invention is different from the first embodiment in that as shown in FIG. 5, the electrical storage device electric power control equipment 35C1 of the electrical storage device control unit 35C in the first embodiment controls so that electric power of the electrical storage device 29 according to a deficit of power of the engine 12 for required power operated by the required power arithmetic unit 35A is supplied to the electric motor 26 when rotational speed of the engine 12 variably controlled by the variable speed control equipment 35B2 is the first rotational speed E1, while an electrical storage device electric power control equipment 45C1 of an electrical storage device control unit 45C in the second embodiment controls so that electric power of an electrical storage device 29 according to a deficit of power of an engine 12 for required power operated by a required power arithmetic unit 35A is supplied to a motor generator 25 when rotational speed of the engine 12 variably controlled by variable speed control equipment 35B2 is second rotational speed E2.

In this case, the electrical storage device electric power control equipment 45C1 controls so that electric power of the electrical storage device 29 according to a deficit of power of the engine 12 for required power operated by the required power arithmetic unit 35A is supplied to the motor generator 25 when rotational speed of the engine 12 variably controlled by the variable speed control equipment 35B2 is in a state of second rotational speed E2 and the required power operated by the required power arithmetic unit 35A is larger than predetermined low power. The other configuration in the second embodiment is similar to that in the first embodiment and the same reference numeral is allocated to a part which is the same as or corresponds to the first embodiment.

Figure 10:
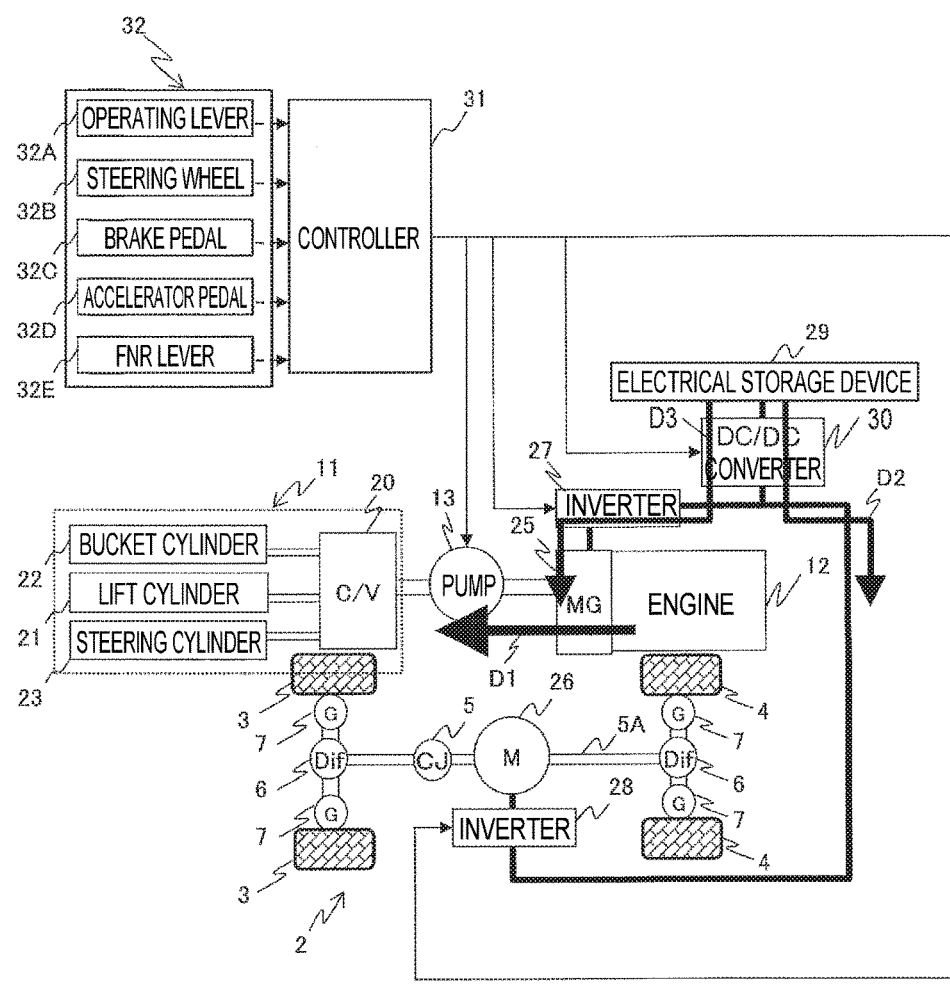
FIG. 10 shows a flow of power output from an engine and an electrical storage device in a second embodiment of the present invention when rotational speed of the engine is first rotational speed.

According to a hybrid wheel loader 1A according to the second embodiment of the present invention and configured as described above, the similar action and effect to those in the first embodiment are acquired, and in addition, even if power of the engine 12 is short for power required for operation of the vehicle when the rotational speed of the engine 12 is the second rotational speed E2, the vehicle can be operated by power acquired by totalizing engine output power and electrical storage device output power as shown in FIG. 10 by driving the motor generator 25 with electric power supplied from the electrical storage device 29 according to the electrical storage device electric power control equipment 45C1. Hereby, efficiency of the engine 12 can be enhanced and the engine 12 can be stably operated.

Figure 11:
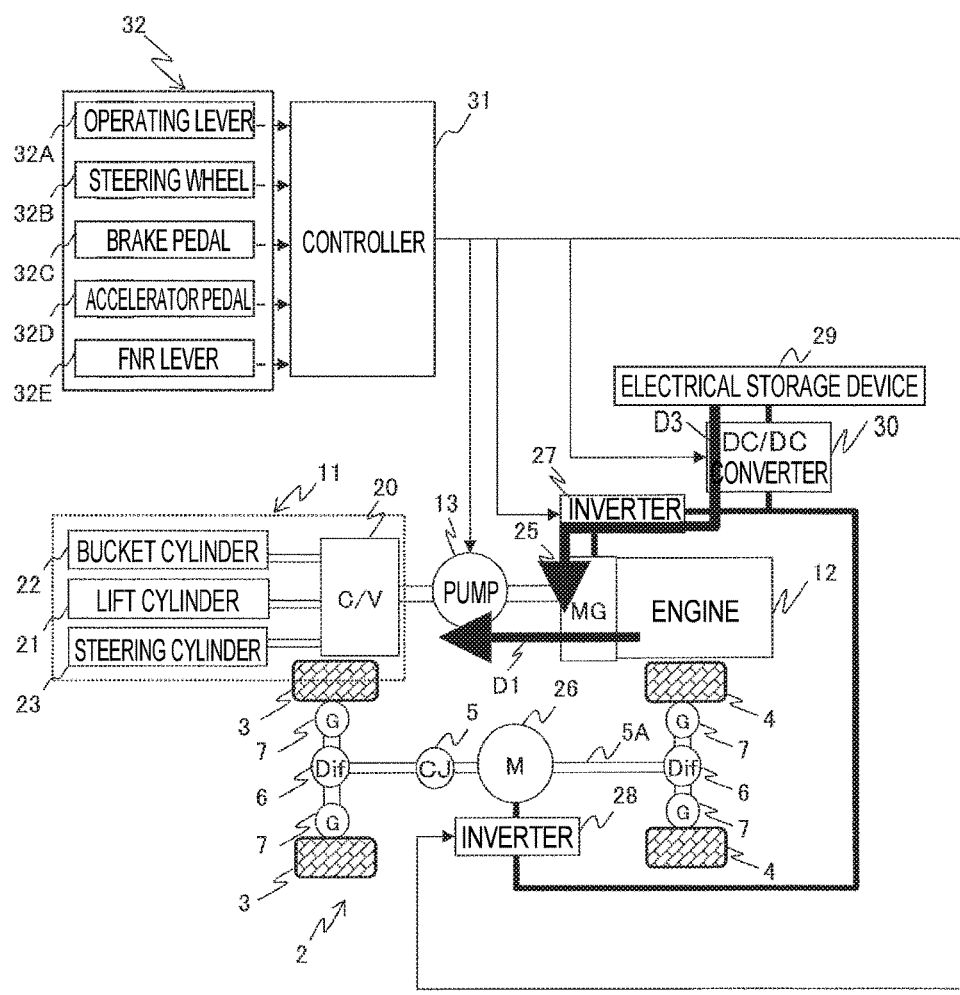
FIG. 11 shows a flow of power output from the engine and the electrical storage device in the second embodiment of the present invention when rotational speed of the engine is second rotational speed.

Besides, in the hybrid wheel loader 1A according to the second embodiment of the present invention, even if hydraulic power increases to an extent that a hydraulic working section 11 cannot be driven by only engine output power and greater power than the predetermined low power is suddenly demanded as required power when rotational speed of the engine 12 is the second rotational speed E2, power of the engine 12 can be promptly assisted by power-running the motor generator 25 with electric power supplied from the electrical storage device 29 according to the electrical storage device electric power control equipment 45C1. At this time, as shown in FIG. 11, as both engine output power and electrical storage device output power are promptly transmitted on the side of the hydraulic working section 11 (in directions of D1, D3), power shortage of the engine 12 can be sufficiently avoided.

Moreover, this embodiment described above is described in detail for plain explanation of the present invention and the present invention is not necessarily limited to the whole described configuration. In addition, a part of the configuration of one embodiment can be replaced with the configuration of another embodiment and the configuration of another embodiment can be also added to the configuration of one embodiment.

Further, in the first and second embodiments of the present invention, there has been described the case that the specified rotational speed setting equipment 35B1 sets the first rotational speed E1 as the upper limit of rotational speed of the engine 12 when required power operated by the required power arithmetic unit 35A is larger than the predetermined high power and sets the second rotational speed E2 as the lower limit of the rotational speed of the engine 12 when required power operated by the required power arithmetic unit 35A is smaller than the predetermined low power, however, the present invention is not limited to this case. For example, on a specific condition, the specified rotational speed setting equipment 35B1 may also set the first rotational speed E1 as a lower limit of rotational speed of the engine 12 and may also set the second rotational speed E2 as an upper limit of rotational speed of the engine 12.

REFERENCE SIGNS LIST 1, 1A Hybrid wheel loader (Hybrid working vehicle)
2 Traveling section
5 Center joint
5A Propeller shaft
11 Hydraulic working section
12 Engine
13 Hydraulic pump
15 Lift
17 Bucket
20 Control valve device
21 Lift cylinder
22 Bucket cylinder
23 Steering cylinder
25 Motor generator
26 Electric motor
27, 28 Inverter
29 Electrical storage device
30 DC/DC converter
31 Controller
32 Manual operating device
35 Hybrid control device
35A Required power arithmetic unit 35A1 Traveling power arithmetic unit
35A2 Hydraulic power arithmetic unit
35B Engine control device
35B1 Specified rotational speed setting equipment
35B2 Variable speed control equipment
35C, 45C Electrical storage device control unit
35C1, 45C1 Electrical storage device electric power control equipment
35D Traveling control unit
35E Hydraulic control unit
36 Hydraulic control device
37 Engine control device
38 Inverter control device
39 Converter control device

The invention claimed is:

1. A hybrid wheel loader, comprising:
an engine;
a motor generator coupled to an output shaft of the engine, the motor generator assisting power of the engine and generating electric power;
an electric motor operated by electric power generated by the motor generator;
a traveling section driven by the electric motor;
a hydraulic working unit driven by pressure oil supplied from a hydraulic pump operated by the power of the engine;
a power storage device for storing electric power generated by the motor generator; and
a hybrid control device that controls a hybrid system using the engine and the electric motor for a power source, wherein the hybrid control device includes:
a required power arithmetic unit for calculating a power required for an operation of the wheel loader by adding a power required for a running operation of the traveling unit and a power required for an operation of the hydraulic working unit;
specified rotational speed setting equipment that respectively sets a first rotational speed and a second rotational speed that specify an operating range of the engine according to power operated by the required power arithmetic unit;
variable speed control equipment that variably controls rotational speed of the engine between the first rotational speed and the second rotational speed according to power operated by the required power arithmetic unit; and
a power storage device power control unit that controls charge/discharge of the power storage device, wherein
when the power calculated by the required power arithmetic unit is larger than a predetermined high power corresponding to the upper limit of the revolution speed of the engine, the specified rotational speed setting equipment sets the first rotational speed as an upper limit of rotational speed of the engine and the variable speed control unit limits the rotation speed of the engine to the first rotation speed;
when the power calculated by the required power arithmetic unit is smaller than a predetermined low power corresponding to the lower limit of the revolution speed of the engine, the specified rotational speed setting equipment sets the second rotational speed as a lower limit of the rotational speed of the engine and the variable speed control unit controls the rotational speed of the engine to the second rotational speed; and
when the rotational speed of the engine is speed-controlled to the second rotational speed by the variable speed control unit and power shortage of the hydraulic working unit is based on only the power output from the engine, the power storage device power control unit discharges the power of the power storage device corresponding to the power shortage of the engine to the power calculated by the required power arithmetic unit to the motor generator and the electric motor, and the motor generator operates as the electric motor to operate the hydraulic working unit by totaling the power output from the engine and the power output from the power storage device and the electric motor is driven only by the power output from the power storage device.

* * * * *